US007940938B2

(12) United States Patent
Miki et al.

(10) Patent No.: US 7,940,938 B2
(45) Date of Patent: May 10, 2011

(54) SOUND REPRODUCING APPARATUS

(75) Inventors: Akira Miki, Hamamatsu (JP); Masayoshi Sahara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1369 days.

(21) Appl. No.: 11/432,225

(22) Filed: May 11, 2006

(65) Prior Publication Data

US 2006/0255993 A1 Nov. 16, 2006

(30) Foreign Application Priority Data

May 11, 2005 (JP) ................................ 2005-138571

(51) Int. Cl.
*H04B 3/00* (2006.01)

(52) U.S. Cl. ................ 381/81; 381/77; 381/80; 381/85; 381/123; 700/94; 330/10; 330/251

(58) Field of Classification Search .................... 381/59, 381/77, 80–81, 85, 120, 123; 330/251, 10; 341/143; 700/94
See application file for complete search history.

(56) References Cited

U.S. PATENT DOCUMENTS

| | | | | |
|---|---|---|---|---|
| 7,058,463 | B1 * | 6/2006 | Ruha et al. | 700/94 |
| 7,248,935 | B2 * | 7/2007 | Teramachi et al. | 700/94 |
| 7,496,417 | B2 * | 2/2009 | Lee et al. | 700/94 |
| 2001/0006553 | A1 * | 7/2001 | Osakabe et al. | 381/80 |
| 2003/0035556 | A1 * | 2/2003 | Curtis et al. | 381/105 |
| 2005/0089178 | A1 * | 4/2005 | Asada et al. | 381/106 |
| 2006/0251197 | A1 * | 11/2006 | Zaucha et al. | 375/350 |
| 2007/0133813 | A1 * | 6/2007 | Morishima | 381/59 |

FOREIGN PATENT DOCUMENTS

| | | |
|---|---|---|
| JP | 9-102996 | 4/1997 |
| JP | 9-233591 | 9/1997 |
| JP | 2001-061196 | 3/2001 |
| JP | 2003-304125 | 10/2003 |

* cited by examiner

*Primary Examiner* — Devona E Faulk
*Assistant Examiner* — Disler Paul
(74) *Attorney, Agent, or Firm* — Pillsbury Winthrop Shaw Pittman LLP

(57) ABSTRACT

A sound reproducing apparatus which can be relatively inexpensive as a whole and also be simple in construction with reduced wiring even in the case where many speakers are used. Pulse-width modulated (PWM) pulses are generated based on respective audio signals for multiple-channel speakers. PWM pulses are time-division multiplexed and amplified, and then output as digital driving signals. The multiple-channel speakers are selectively turned on/off such that the digital driving signals are supplied to the respective multiple-channel speakers of corresponding channels.

7 Claims, 4 Drawing Sheets

SOUND REPRODUCING APPARATUS

BACKGROUND OF THE INVENTION

1. Field of the Invention

The present invention relates to a sound reproducing apparatus which reproduces sounds using a plurality of speakers such as a speaker array.

2. Description of the Related Art

Conventionally, there have been sound reproducing apparatuses which reproduce sounds using multiple-channel speakers such as a speaker array. With sound reproducing apparatuses of this type, a wide variety of sound fields can be formed by emitting sounds via many speakers. Particularly with sound reproducing apparatuses using a speaker array, acoustic beams with given directivities can be output from respective speakers to thereby form a realistic and powerful sound field. Note that examples of publications regarding a speaker array include Japanese Laid-Open Patent Publication (Kokai) No. H09-233591.

The above conventional sound reproducing apparatuses, however, have the problem of being expensive as a whole because power amplifiers for a plurality of channels are needed so as to drive multiple-channel speakers, and also has the problem of being complicated in construction because signal lines connecting a power amplifier and speakers are needed for each channel.

SUMMARY OF THE INVENTION

It is an object of the present invention to provide a sound reproducing apparatus which can be relatively inexpensive as a whole and also be simple in construction with reduced wiring even in the case where many speakers are used.

To attain the above object, in a first aspect of the present invention, there is provided a sound reproducing apparatus comprising multiple-channel speakers, a modulator that generates multiple-channel digital driving signals modulated based on respective multiple-channel audio signals, a multiplexer comprising a multiplexing section that time-division multiplexes the multiple-channel digital driving signals and a power amplifier that amplifies and outputs the time-division multiplexed multi-channel digital driving signals, a plurality of switches that selectively turn on/off respective ones of the multiple-channel speakers, and a switch controller that provides control to selectively turn on/off the plurality of switches such that the multiple-channel digital driving signals output from the multiplexer are supplied to respective speakers of corresponding channels among the multiple-channel speakers.

Preferably, the switch controller provides control to selectively turn on/off the plurality of switches in synchronization with multiplexing carried out by the multiplexer.

Also preferably, the multiplexer outputs each of the multi-channel digital driving signals next after an identifier indicative of a corresponding channel, and the switch controller causes a switch corresponding to a speaker of the channel identified by the identifier among the plurality of switches to be kept on for a predetermined time period after the identifier is output.

More preferably, the modulator is capable of changing pulse widths of the multi-channel digital driving signals to be generated, and the multiplexer adds duration information for controlling timing in which the plurality of switches are controlled to be selectively turned on/off to the identifier.

Preferably, the multiple-channel speakers are disposed in a matrix, and the switch controller selects a row and a column of the matrix disposition according to the digital driving signals and provides control to selectively turn on/off the switches corresponding to the selected row and column to thereby supply the digital driving signals to corresponding ones of the multiple-channel speakers.

More preferably, the switch controller provides control to selectively turn on/off the plurality of switches in synchronization with multiplexing carried out by the multiplexer.

Also more preferably, the multiplexer outputs each of the multi-channel digital driving signals next after an identifier indicative of a corresponding channel, and the switch controller causes a switch corresponding to a speaker of the channel identified by the identifier among the plurality of switches to be kept on for a predetermined time period after the identifier is output.

Preferably, the sound reproducing apparatus comprises a time-alignment device that compensates timing in which the multi-channel speakers are driven based on the multiple-channel digital driving signals.

According to the present invention, a power amplifier is shared among a plurality of channels, and multiple-channel speakers can be driven by time-sharing control through one driving signal line. As a result, the sound reproducing apparatus as a whole can be relatively inexpensive and also be simple in construction.

The above and other objects, features, and advantages of the invention will become more apparent from the following detained description taken in conjunction with the accompanying drawings.

DETAILED DESCRIPTION OF THE PREFERRED EMBODIMENTS

The present invention will now be described in detail with reference to the drawings showing preferred embodiments thereof.

First, a description will be given of a sound reproducing apparatus according to a first embodiment of the present invention.

Figure 1:
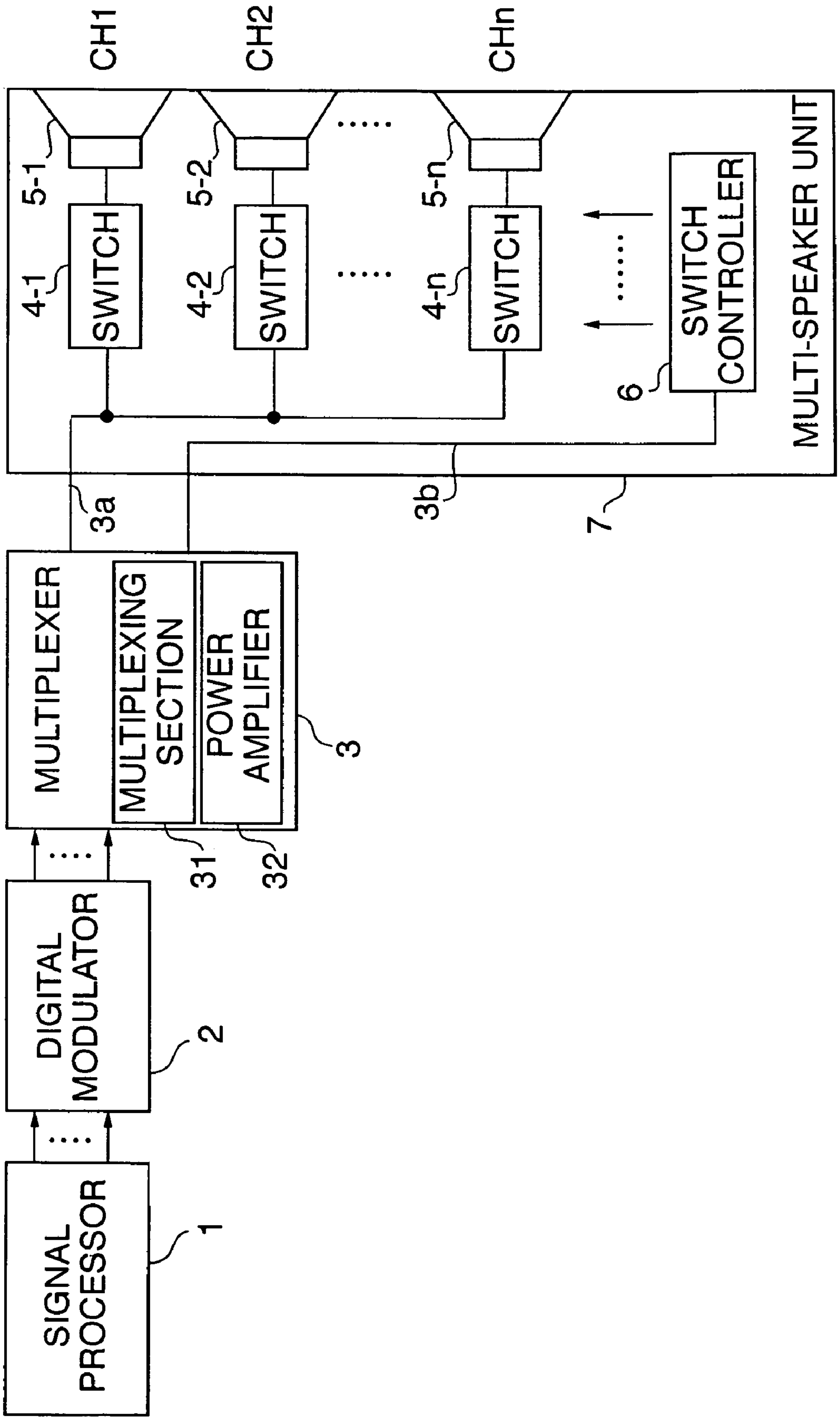
FIG. 1 is a block diagram showing the construction of a sound reproducing apparatus according to a first embodiment of the present invention.

FIG. 1 is a block diagram showing the construction of the sound reproducing apparatus according to the first embodiment. This sound reproducing apparatus is comprised mainly of a signal processor 1, a digital modulator 2, a multiplexer 3, and a multi-speaker unit 7.

The signal processor 1 is a device that generates audio signals for a plurality of channels so as to form a designated sound field. In one preferred form, the multi-speaker unit 7 is a speaker array comprised of a plurality of speakers arranged in a line or matrix and is used to output acoustic beams with sharp directivities. In this preferred form, the signal processor 1 generates delay audio signals for a plurality of channels from a common audio signal acquired from an audio source, not shown, and supplies the delay audio signals to the multi-speaker unit 7 through the digital modulator 2 and the multiplexer 3. On this occasion, the signal processor 1 carries out time-delay of the delay audio signals for the respective channels or adjusts their phases and amplitudes in accordance with the directions and directivity sharpness of acoustic beams to be output.

The digital modulator 2 is a device that modulates pulses of a fixed sampling frequency according to an audio signal with respect to each channel and outputs the modulated pulses. The digital modulator 2 may use a wide variety of modulating methods such as PAM (Pulse Amplitude Modulation) and PWM (Pulse Width Modulation), but in the following description, it is assumed that PWM is used for the convenience of explanation.

The multiplexer 3 has a multiplexing section 31 and a power amplifier 32 incorporated therein. In the multiplexer 3, the multiplexing section 31 carries out time-division multiplexing of a train of pulse-width modulated (PWM) pulses for the plurality of channels which have been obtained by the digital modulator 2. The power amplifier 32 then amplifies and outputs the train of PWM pulses time-division multiplexed as digital driving signals to a driving signal line 3*a*.

The multi-speaker unit 7 is comprised of speakers 5-k (k=1 to n) of n channels, switches 4-k (k=1 to n) interposed between respective inputs of the speakers 5-k (k=1 to n) and the driving signal line 3*a*, and a switch controller 6 which provides control to selectively turn on/off the switches 4-k (k=1 to n). The switches 4-k (k=1 to n) are analog switches implemented by, for example, MOS transistors and selectively turned on/off by gate voltages applied from the switch controller 6. In the present embodiment, the switch controller 6 selectively turns on/off the switches 4-k (k=1 to n) in synchronization with multiplexing carried out by the multiplexer 3; for example, when a digital driving signal for a channel k is output from the multiplexer 3, the switch controller 6 turns on only a switch 4-k corresponding to the channel k. Specifically, the switch controller 6 selectively turns on/off the switches 4-k (k=1 to n) in synchronization with multiplexing signals received from the multiplexer 3 via a synchronization signal line 3*b* so that the switches 4-k (k=1 to n) can be selectively turned on/off in synchronization with multiplexing carried out by the multiplexer 3.

Figure 2:
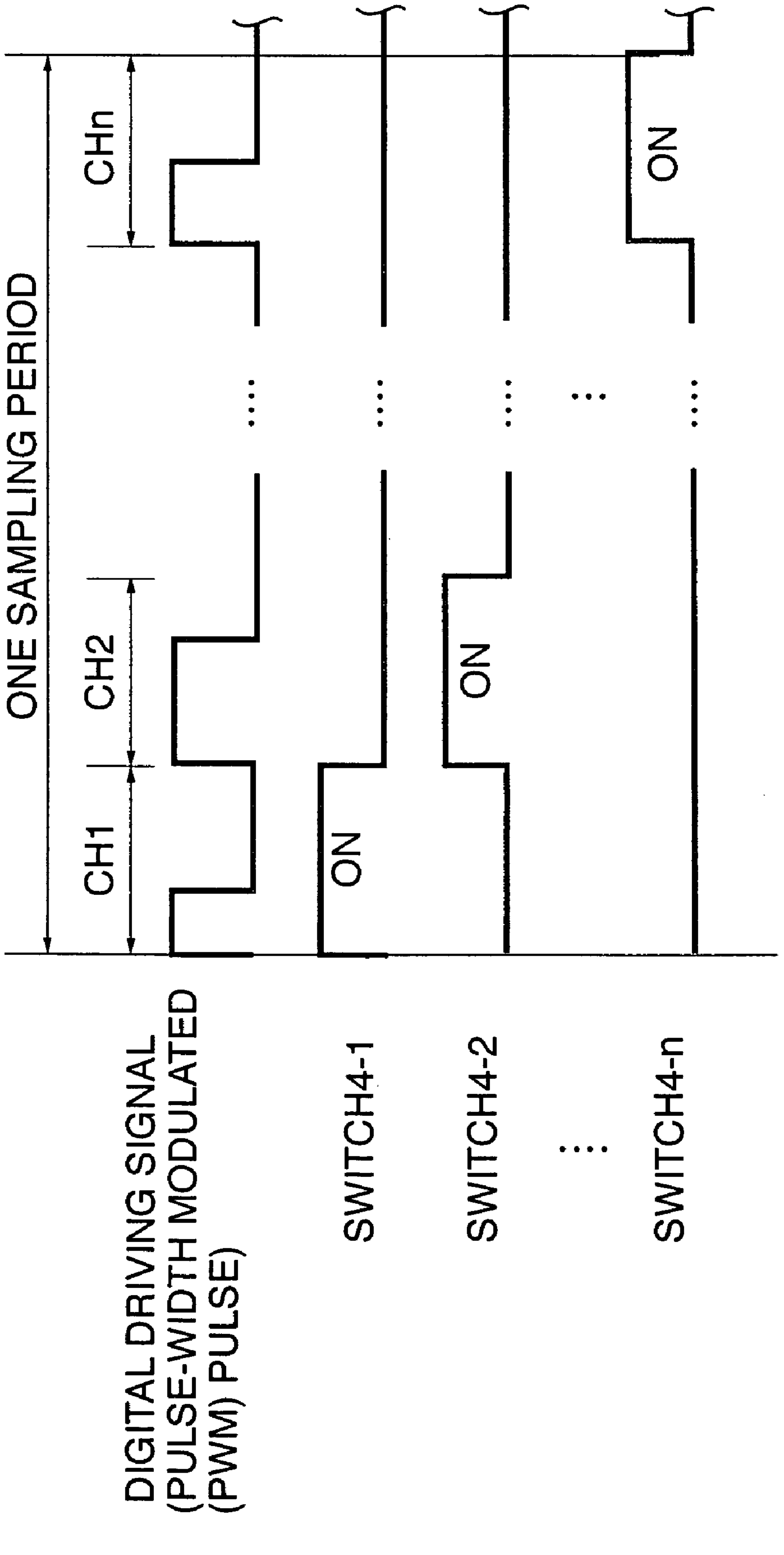
FIG. 2 is a time chart showing the operation of the sound reproducing apparatus in FIG. 1.

FIG. 2 is a time chart showing the operation of the sound reproducing apparatus according to the present embodiment. In the present embodiment, the signal processor 1 generates audio signals for n channels in one sampling period, and the digital modulator 2 outputs pulses for the n channels which have been pulse-width modulated in accordance with the audio signals of the respective channels in the one sampling period. As shown in FIG. 2, the multiplexer 3 then divides the one sampling period into n periods and sequentially uses the n periods to sequentially output digital driving signals of the respective channels to the driving signal line 3*a*; for example, the first period of the divided n periods is used to output a digital driving signal for a channel 1, and the next period of the same is used to output a digital driving signal for a channel 2.

The switches 4-k (k=1 to n) are then selectively turned on/off in synchronization with outputting of digital driving signals of the respective channels to the driving signal line 3*a*; for example, the switch 4-1 is on for the period during which the digital driving signal for the channel 1 is output to the driving signal line 3*a*, and the switch 4-2 is on for the period during which the digital driving signal for the channel 2 is output to the driving signal line 3*a*. Thus, the digital driving signals for respective channels k are supplied to the speakers 5-k via the respective corresponding switches 4-k.

As described above, according to the present embodiment, since the switches 4-k (k=1 to n) are selectively turned on/off by time-sharing control, digital driving signals for a plurality of channels can be supplied to the respective speakers 5-k (k=1 to n) corresponding to respective channels through one power amplifier and one driving signal line. As a result, even in the case where many speakers are used, the sound reproducing apparatus as a whole can be relatively inexpensive and also be simple in construction with reduced wiring.

Next, a description will be given of a sound reproducing apparatus according to a second embodiment of the present invention.

Figure 3:
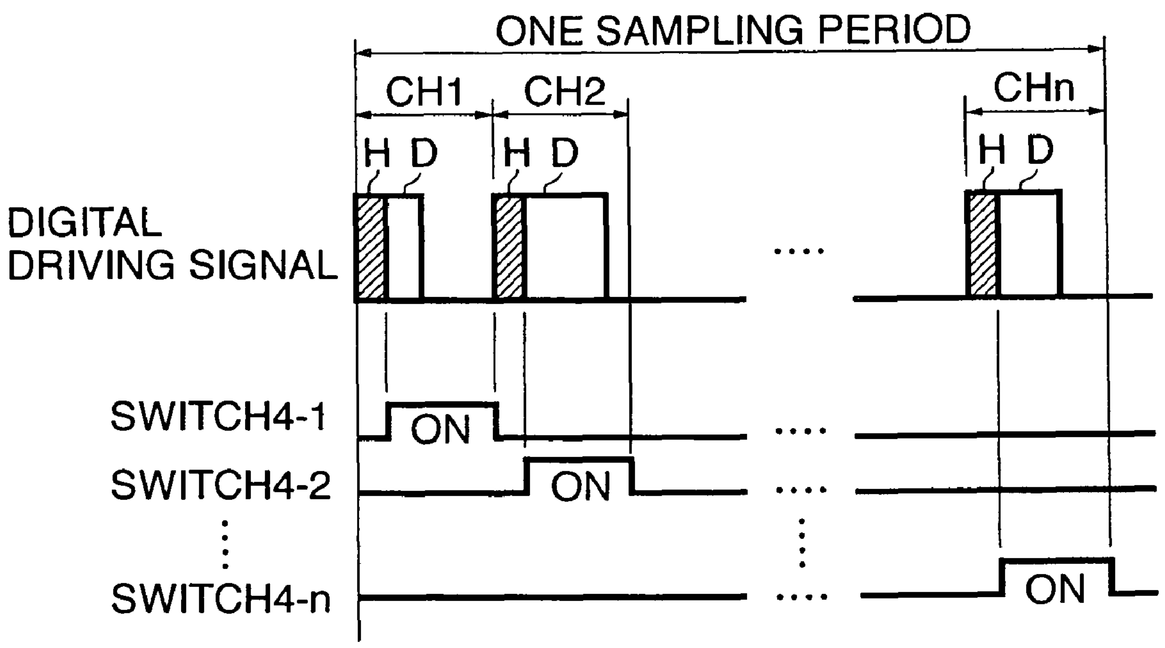
FIG. 3 is a time chart showing the operation of a sound reproducing apparatus according to a second embodiment of the present invention.

FIG. 3 is a time chart showing the operation of the sound reproducing apparatus according to the second embodiment. This sound reproducing apparatus is basically identical in construction with that of the above described first embodiment (see FIG. 1). However, there are differences as described below between the present embodiment and the above described first embodiment.

First, as shown in FIG. 3, in each of n periods divided from one sampling period, the multiplexer 3 outputs a header H including a channel identifier to the driving signal line 3*a* and then outputs a pulse-width modulated (PWM) digital driving signal D of the channel of the channel identifier to the driving signal line 3*a*. It should be noted that identifiers are indicative of the respective speakers 5-k (k=1 to n) and they are set in advance by, for example, a user, and generated by, for example, the multiplexer 3.

In each of the n periods divided from the one sampling period, the switch controller 6 keeps all the switches 4-k (k=1 to n) off for the period during which a header H is output, while the switch controller 6 receives a header H via the driving signal line 3*a* and determines a channel to which a subsequent digital driving signal belongs based on the header H. In the period during which the digital driving signal D is output next after the received header H, the switch controller 6 keeps in on-state a switch 4-k corresponding to the channel determined based on the header H. The digital driving signal D thus output to the driving signal line 3*a* is supplied to a speaker corresponding to the concerned channel. Further, the synchronization signal line 3*b* becomes unnecessary.

In the present embodiment, the same effects can be obtained as in the above described first embodiment.

Figure 4:
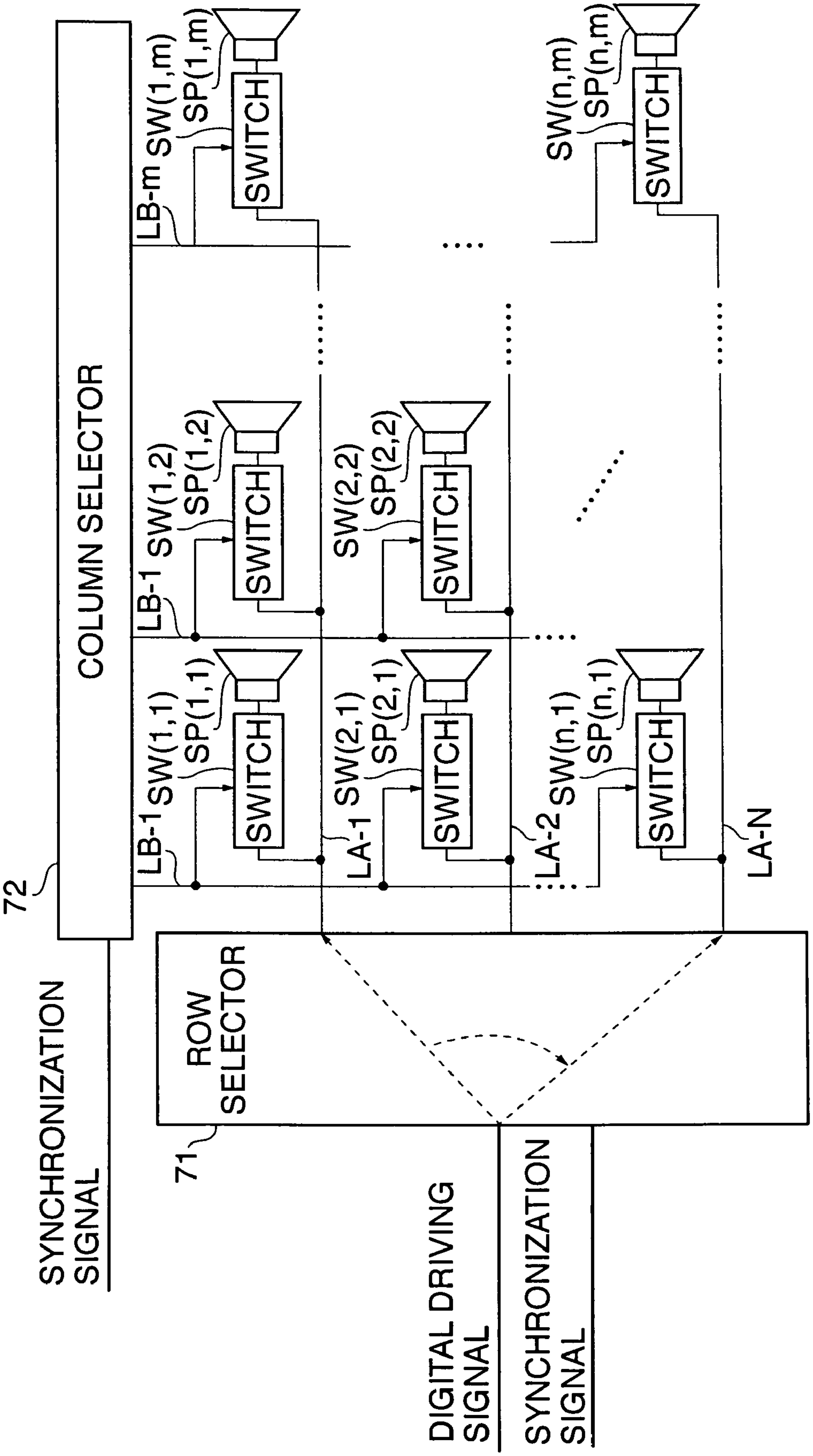
FIG. 4 is a block diagram showing the construction of a multi-speaker unit of a sound reproducing apparatus according to a third embodiment of the present invention.

Next, a description will be given of a sound reproducing apparatus according to a third embodiment of the present invention. In the present embodiment, a modification is made to the multiplayer unit 7 of the first or second embodiment described above. FIG. 4 is a block diagram showing the construction of a multi-speaker unit in the sound reproducing apparatus according to the present embodiment. This multi-speaker unit is comprised of speakers SP (i, j) (i=1 to n, j=1 to m) disposed in a matrix, and switches SW (i, j) (i=1 to n, j=1 to m) provided at respective inputs of the speakers SP (i, j). This multi-speaker unit is also provided with n row lines LA-i (i=1 to n) and m column lines LB-j (j=1 to m) intersecting thereto. Input terminals of m switches SW (i, j) (j=1 to m) belonging to the ith row are connected to each row line LA-i. The column lines LB-j are connected to respective gate terminals of n switches SW (i, j) (i=1 to n) belonging to the jth column. The column lines LB-j are used to supply gate voltages which turn on/off the n switches SW (i, j) (i=1 to n). A row selector 71 is a circuit which divides one sampling period into n periods and sequentially uses the n periods to sequentially connect the n row lines LA-i (i=1 to n) to the driving signal line 3*a* appearing in FIG. 1. A column selector 72 is a circuit which divides each of n periods divided from one sampling period into m periods and sequentially uses the m periods to sequentially output gate voltages which turn on the switches SW (i, j) to the m column lines LB-j (i=1 to m).

In the present embodiment, the signal processor 1 appearing in FIG. 1 generates audio signals for m×n channels in one sampling period, and the digital modulator 2 outputs pulses for the m×n channels which have been pulse-width modulated according to the audio signals of the respective channels in the one sampling period. The multiplexer 3 appearing in FIG. 1 then divides the one sampling period into m×n periods and sequentially uses the m×n periods to sequentially output digital driving signals for the respective channels to the driving signal line 3*a*; for example, the multiplexer 3 outputs a digital driving signal to a speaker SP (1, 1) in the first period of the divided m×n periods, outputs a digital driving signal to a speaker SP (1, 2) in the next period of the same, . . . , and outputs a digital driving signal to a speaker SP (n, m) in the last period of the divided m×n periods.

The row selector 71 then divides the one sampling period into n periods, and connects the driving signal line 3*a* to a row line LA-1 in the first period of the n periods. On the other hand, the column selector 72 divides each of the n periods divided from the one sampling period into m periods and sequentially uses the m periods to sequentially output gate voltages which turn on the switches SP (i, j) to the m column lines LB-j (j=1 to m). Thus, in the first period of the n periods divided from the one sampling period, digital driving signals for m channels sequentially output to the signal driving line 3*a* are sequentially supplied to m speakers SP (1, j) (j=1 to m) belonging to the first row. In the second period of the n periods divided from the one sampling period, the driving signal line 3*a* is connected to a row line LA-2 by the row selector 71. In this period, gate voltages are supplied by the column selector 72 in the same manner as is the case with the first row. Thus, in the second period of the n periods divided from the one sampling period, digital driving signals for m channels sequentially output to the signal driving line 3*a* are sequentially supplied to m speakers SP (2, j) (j=1 to m) belonging to the second row. Thereafter, the same processing is repeatedly carried out, and consequently, in the one sampling period, digital driving signals for the m×n channels are sequentially supplied to the speakers SP (i, j) (i=1 to n, j=1 to m) by using one power amplifier and one driving signal line 3*a* of the multiplexer 3 in a time-sharing manner.

It should be noted that the row selector 71 and the column selector 72 may select a row line LA-i and a column line LB-j in various ways. In one preferred form, as is the case with the first embodiment described above, the row selector 71 and the column selector 72 select a row line LA-i and a column line LB-j in response to synchronization signals from the multiplexer 3 and in synchronization with outputting of digital driving signals by the multiplexer 3. In another preferred form, as is the case with the second embodiment described above, the multiplexer 3 outputs a digital driving signal as well as a header including a channel identifier to the driving signal line 3*a*, and the row selector 71 and the column selector 72 determine a channel corresponding to the digital driving signal based on the header output to the driving signal line 3*a* and selects a row LA-i and a column LB-j according to the determination result. In the present embodiment as well, the same effects can be obtained as in the first and second embodiments described above.

Next, a description will be given of other embodiments of the present invention.

It is to be understood that the present invention is not limited to the first to third embodiments described above, but various changes in or to those embodiments may be possible without departing from the spirits of the present invention, including changes as described below.

(1) In the above described embodiments, a plurality of speakers are sequentially driven by time-sharing control. For this reason, even in the same sampling period, there are variations in the driving timing of speakers; for example, one speaker is driven nearly at the time at which the sampling period starts, and another speaker is driven nearly at the time at which the sampling period ends. Thus, when the signal processor 1 generates delay audio signals for a plurality of channels so as to output acoustic beams with given directivities from the multi-speaker unit 7, it is preferred that time alignment processing intended to compensate for variations in the driving timing of the speakers is performed on the delay audio signals for the respective channels.

(2) In the second embodiment described above, a channel corresponding to a digital driving signal sequential to a header output to the driving signal line 3*a* may be determined based on the header, and a switch that turns on the determined channel corresponding to the digital driving signal may be determined. Thus, in this embodiment, headers and digital driving signals for respective channels should not necessarily be output to the driving signal line by sequentially using n periods divided from one sampling period. Also, in each sampling period, headers and digital driving signals for all the channels should not necessarily be output to the driving signal line. Also, where headers and digital driving signals for respective channels are output in a given order to the driving signal line in a given sampling period, headers and digital driving signals for respective channels may be output in a different order to the driving signal line in the next sampling period.

(3) In the second embodiment described above, in accordance with the pulse width of a digital driving signal output next after a header, the output timing of a header for the next channel may be advanced or delayed. In this variation of the second embodiment, however, it is preferred that duration information indicative of the interval time up to a subsequent header as well as a channel identifier is included in each header. This enables the switch controller 6 of the multi-speaker unit 7 to turn on a switch corresponding to a channel designated by an identifier in a header by the amount of time designated by duration information in the header and thereafter read the header output to the driving signal line 3*a*. According to this variation, in the case where it is necessary to increase the pulse width of a digital driving signal for a given channel, the output timing of a header for the next channel is delayed to secure the time required for increasing the pulse width. As a result, the dynamic range per channel can be widened.

What is claimed is:

1. A sound reproducing apparatus comprising:

multiple-channel speakers;

a modulator that generates multiple-channel digital driving signals modulated based on respective multiple-channel audio signals;

a multiplexer comprising a multiplexing section that time-division multiplexes the multiple-channel digital driving signals and a power amplifier that amplifies and outputs the time-division multiplexed multi-channel digital driving signals;

a plurality of switches that selectively turn on/off respective ones of said multiple-channel speakers; and a switch controller that provides control to selectively turn on/off said plurality of switches such that the multiple-channel digital driving signals output from said multiplexer are supplied to respective speakers of corresponding channels among said multiple-channel speakers, wherein said multiplexer outputs each of the multi-channel digital driving signals next after an identifier indicative of a corresponding channel, and said switch controller causes a switch corresponding to a speaker of the channel identified by the identifier among said plurality of switches to be turned on, after keeping all of said plurality of switches off for a predetermined time period during which the identifier is output.

2. A sound reproducing apparatus according to claim 1, wherein said switch controller provides control to selectively turn on/off said plurality of switches in synchronization with multiplexing carried out by said multiplexer.

3. A sound reproducing apparatus according to claim 1, wherein said multiple-channel speakers are disposed in a matrix, and said switch controller selects a row and a column of the matrix disposition according to the digital driving signals and provides control to selectively turn on/off said switches corresponding to the selected row and column to thereby supply the digital driving signals to corresponding ones of said multiple-channel speakers.

4. A sound reproducing apparatus according to claim 3, wherein said switch controller provides control to selectively turn on/off said plurality of switches in synchronization with multiplexing carried out by said multiplexer.

5. A sound reproducing apparatus according to claim 1, comprising a time-alignment device that compensates timing in which said multi-channel speakers are driven based on the multiple-channel digital driving signals.

6. A sound reproducing apparatus according to claim 1, wherein said modulator is capable of changing pulse widths of the multi-channel digital driving signals to be generated, and said multiplexer adds duration information for controlling timing in which said plurality of switches are controlled to be selectively turned on/off to the identifier.

7. A sound reproducing apparatus comprising:

a plurality of N speakers, N being an integer equal to or greater than four;

a source signal generator that generates N source signals;

a multiplexer that time-division multiplexes the N sources signals into N time slots of a driving signal, each of the N time slots of the driving signal having an identifier period having identifier information which identifies a corresponding one of the N speakers and a signal information period having signal information which is determined by a corresponding one of the N source signals;

a plurality of N switches disposed between the driving signal and the N speakers; and a switch controller for selectively enabling the plurality of N switches in response to the identifier information so that the signal information is coupled to the corresponding speaker during the signal information period of the corresponding time slot, wherein the switch controller causes all of the plurality of N switches to be disabled during the identifier period of the N time slots.

* * * * *